United States Patent
Myles et al.

[11] Patent Number: 5,887,777
[45] Date of Patent: Mar. 30, 1999

[54] COMPUTER CARRYING BAG

[75] Inventors: Ian J Myles, Mountain View, Calif.; Howard C. Shane, Chestnut Hill, Mass.; Gregory G. Baker, Los Angeles, Calif.; James C. Lewis, Newton, Mass.

[73] Assignee: Assistive Technology, Inc., Chestnut Hill, Mass.

[21] Appl. No.: 942,473

[22] Filed: Oct. 2, 1997

Related U.S. Application Data

[60] Provisional application No. 60/054,904 Aug. 5, 1997.

[51] Int. Cl.⁶ ........................................ A45F 3/02
[52] U.S. Cl. .................... 224/578; 224/584; 224/270; 224/930; 206/320; 190/102; 190/112; 190/900
[58] Field of Search .................... 224/575, 578, 224/579, 560, 586, 600, 610, 613, 614, 616, 617, 270, 929, 930, 153, 584, 585; D3/218; 206/320, 769, 771; 150/105; 190/1, 6, 10, 102, 109, 112, 900

[56] References Cited

U.S. PATENT DOCUMENTS

| | | | |
|---|---|---|---|
| D. 355,170 | 2/1995 | Mizusugi et al. | D14/100 |
| 4,420,078 | 12/1983 | Belt et al. | 224/236 X |
| 4,896,805 | 1/1990 | Klaczak et al. | 224/930 X |
| 4,921,103 | 5/1990 | Cohen | 206/320 X |
| 5,133,076 | 7/1992 | Hawkins et al. | 395/800 |
| 5,395,023 | 3/1995 | Naymark et al. | 224/245 X |
| 5,405,068 | 4/1995 | Lovett | 224/153 |
| 5,445,266 | 8/1995 | Prete et al. | 206/320 |
| 5,494,157 | 2/1996 | Golenz et al. | 206/320 |
| 5,639,004 | 6/1997 | Carlton et al. | 224/579 |
| 5,706,992 | 1/1998 | Moor | 190/102 X |
| 5,724,225 | 3/1998 | Hrusoff et al. | 224/270 X |
| 5,762,250 | 6/1998 | Carlton et al. | 224/579 |

*Primary Examiner*—Allan N. Shoap
*Assistant Examiner*—Gregory M. Vidovich
*Attorney, Agent, or Firm*—Hamilton, Brook, Smith & Reynolds, P.C.

[57] ABSTRACT

A protective carrying bag for a computer includes opposing front and back walls. An opening in the front wall provides access by a user for viewing a screen on the computer when the computer is contained within the bag. Opposing openable first and second side walls as well as a lower wall extend between the front and back walls. An openable upper flap is positioned between the front and back walls. A carrying strap is included which is capable of being secured in a first arrangement for carrying the bag in a substantially vertical orientation and in a second arrangement for carrying the bag in a substantially horizontal orientation such that the computer can be operated through the opening in the front wall while being carried in the substantially horizontal orientation.

19 Claims, 14 Drawing Sheets

COMPUTER CARRYING BAG

RELATED APPLICATION

This application claims priority to U.S. Provisional Application No. 60/054,904, filed on Aug. 5, 1997, the entire teachings of which are incorporated herein by reference.

BACKGROUND OF THE INVENTION

Currently, luggage style bags are often employed for carrying and protecting laptop, tablet and other general purpose portable computers. Such computers are typically about 12 inches by 9.5 inches by 2.25 inches in size and about 8 lbs. in weight. In order to use the computer, the computer must be removed from the protective bag. While this may be suitable for most of the general population, there is a population of disabled people who carry a general purpose portable computer with them which provides assistance for their disability (for example, provides speech for people unable to speak). In addition, there are certain occupations where it would be useful to carry and operate a general purpose portable computer, for example, conducting inventory in a warehouse. Current computer bags are unsuitable for such uses because the user is unable to quickly access and easily operate the computer while carrying the computer.

SUMMARY OF THE INVENTION

The present invention provides a protective carrying bag which allows a user to carry as well as operate a general purpose portable computer without removing the computer from the bag.

The bag includes opposing front and back walls. An opening in the front wall provides access by a user for viewing a screen on the computer when the computer is contained within the bag. Opposing first and second side walls as well as a lower wall extend between the front and back walls. An upper flap is positioned between the front and back walls opposite to the lower wall. A carrying strap is included which is capable of being secured in a first arrangement for carrying the bag in a substantially vertical orientation and in a second arrangement for carrying the bag in a substantially horizontal arrangement whereby the computer can be operated via the opening in the front wall while being carried in the substantially horizontal orientation.

In preferred embodiments, the carrying strap is securable to latching fixtures located on the lower wall and the upper flap. When the carrying strap is secured to the latching fixtures located on the upper flap, the carrying strap is secured in the first arrangement for carrying the bag in the substantially vertical orientation. When the carrying strap is secured to one latching fixture on the upper flap and one latching fixture on the lower wall, the carrying strap is secured in the second arrangement for carrying the bag in the substantially horizontal orientation. The upper flap is openable and foldably connected to the front wall and includes first and second straps for securing the upper flap to the back wall. The upper flap also includes an opening for allowing a power cord to be connected to the computer. Opening devices are included on the first and second side walls for opening and closing the side walls. The back wall includes a mounting fixture for accepting a support member of a support bracket for supporting the bag, for example, on a wheelchair. The front and back walls of the bag are preferably semi-rigid. The semi-rigid front wall includes a depressible region for allowing the user to access a button on the computer. The front wall also includes apertures for allowing sound from speakers of the computer to be heard by the user.

The present invention also provides a foldable protective jacket for the general purpose portable computer. The foldable jacket includes a first protective panel having first and second sub-panels foldably connected along a first fold line. The first sub-panel has a fastener for fastening to the computer. A second protective panel is foldably connected to the first protective panel along a second fold line. A third protective panel is foldably connected to the second protective panel along a third fold line. A strap extending from the first sub-panel is capable of fastening to the third panel to secure the jacket substantially around the computer with the first and second sub-panels lying along the same plane. The jacket also is capable of being folded along the first and second fold lines such that the first and second sub-panels are at an angle relative to each other as well as the third panel, whereby the first sub-panel is fastened to the third panel at an angle to tilt the computer for viewing and use.

In preferred embodiments, the first, second and third fold lines are parallel to each other. The computer is secured to the first sub-panel, the strap is securable to the third panel and the first sub-panel is securable to the third panel at an angle, all with hook and loop fasteners. The first panel, second panel and third panel are covered with flexible material and have plastic cores sandwiched between foam padding. The jacket has an interior surface and an exterior surface. The interior surface faces outwardly and the second and third panels lie along the same plane when the jacket is folded to tilt the computer.

When carrying the computer within the present invention bag, the computer is preferably inserted into the bag while fastened to the jacket. The third panel of the jacket is positioned over the exterior surface of the front wall of the bag for protecting the screen of the computer.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

Referring to FIGS. 1–5, computer carrying bag 50 is capable of carrying and protecting a tablet computer 10 (FIG. 1) having an integral touch sensitive screen 26. Bag 50 includes a front wall 48, a back wall 49, two side walls 54, a lower wall 62 and an upper flap 56. The front wall 48, back wall 49 and upper flap 56 preferably include semi-rigid cores while sidewalls 54 and the lower wall 62 are soft or flexible. Front wall 48 has an opening 52 for providing access to the screen 26 of computer 10 so that computer 10 can be operated while carried in bag 50. Upper flap 56 can be opened and closed for inserting or removing computer 10 from bag 50. Shoulder strap 46 enables bag 50 to be carried on the shoulder of the user.

Figure 6:
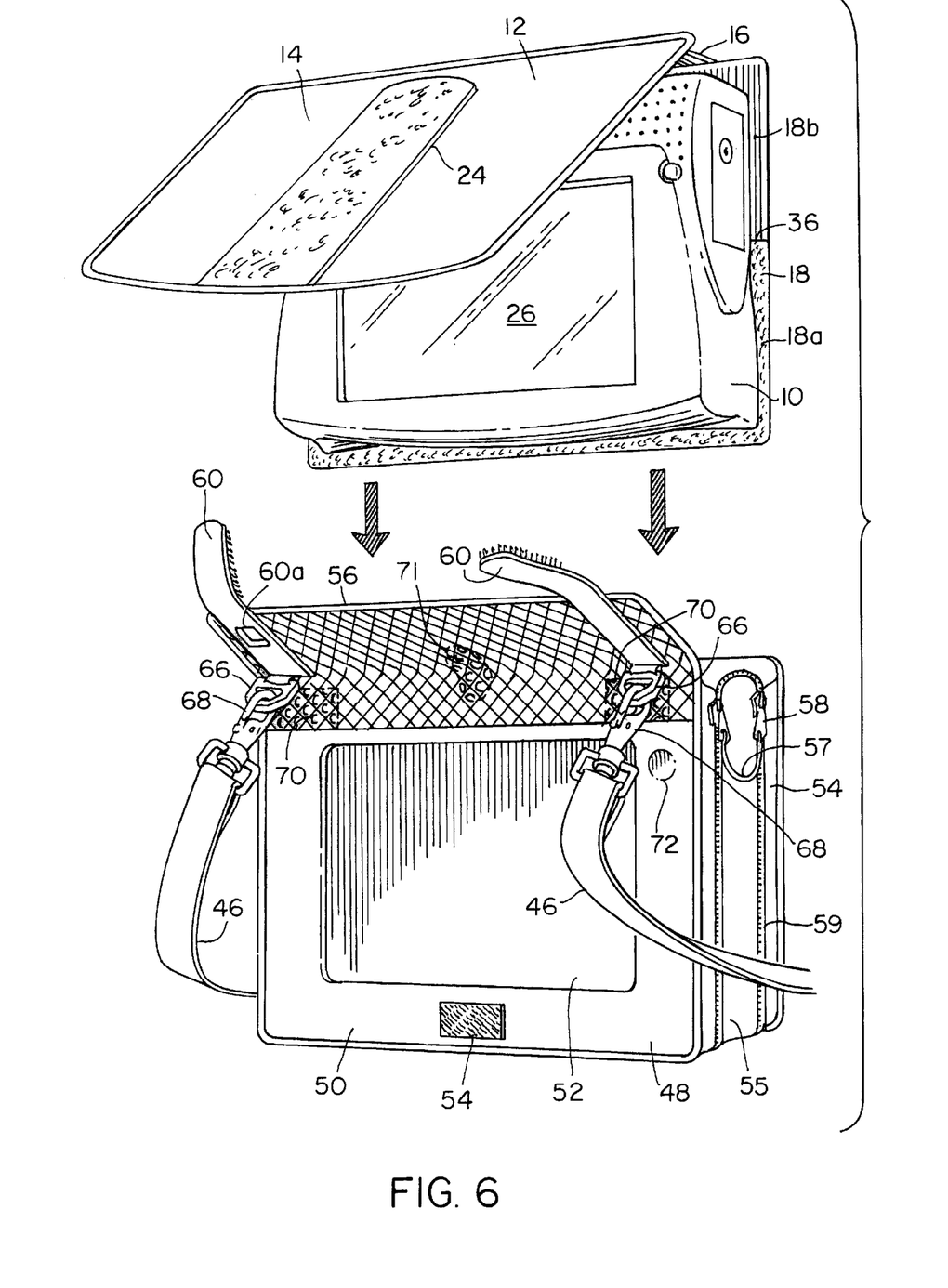
FIG. 6 is a perspective view depicting the tablet computer with a present inventive protective jacket being inserted into the carrying bag.
Figure 7:
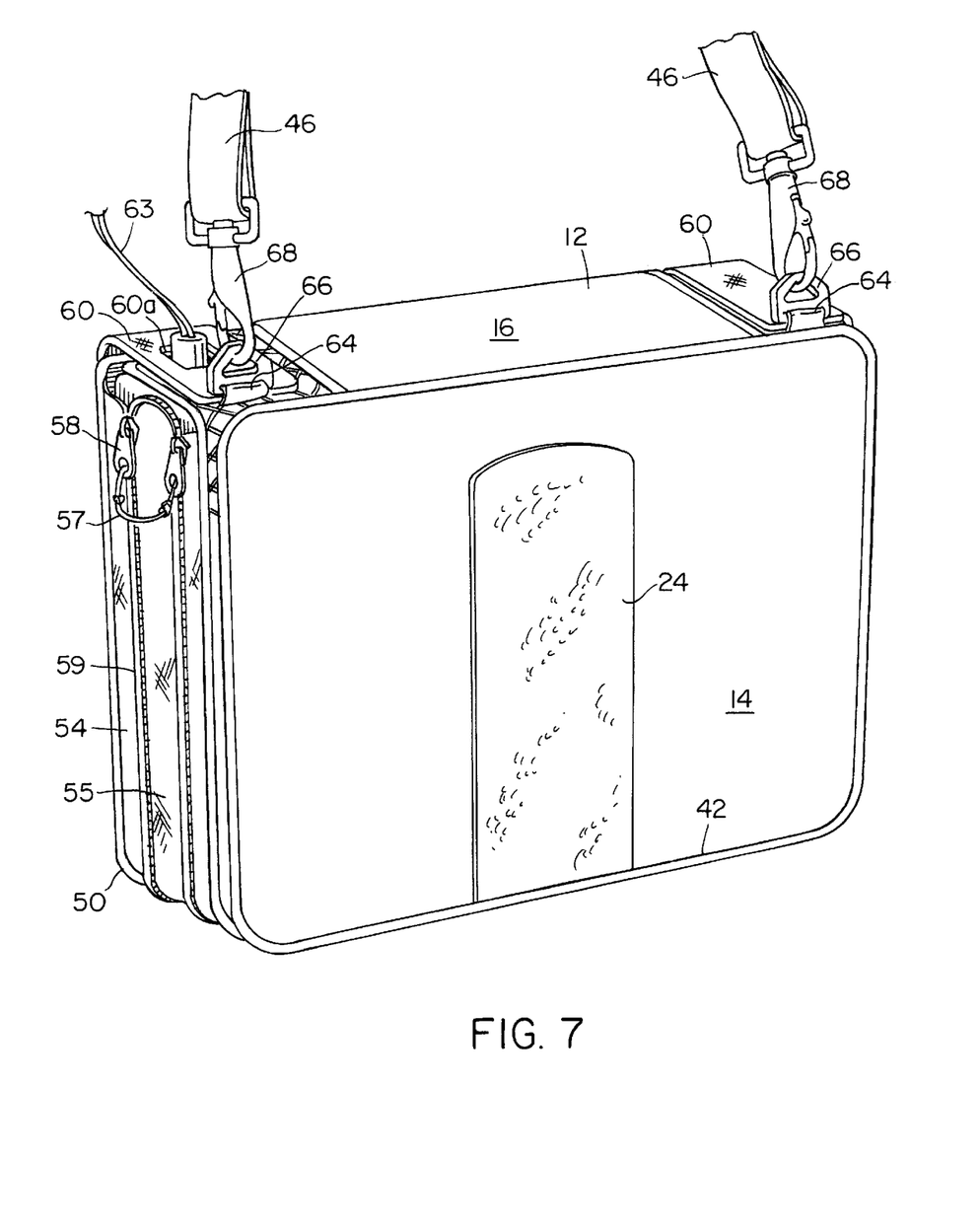
FIG. 7 is a front perspective view of the carrying bag and jacket with the top panel of the jacket secured over the front wall of the bag.
Figures 8, 9:
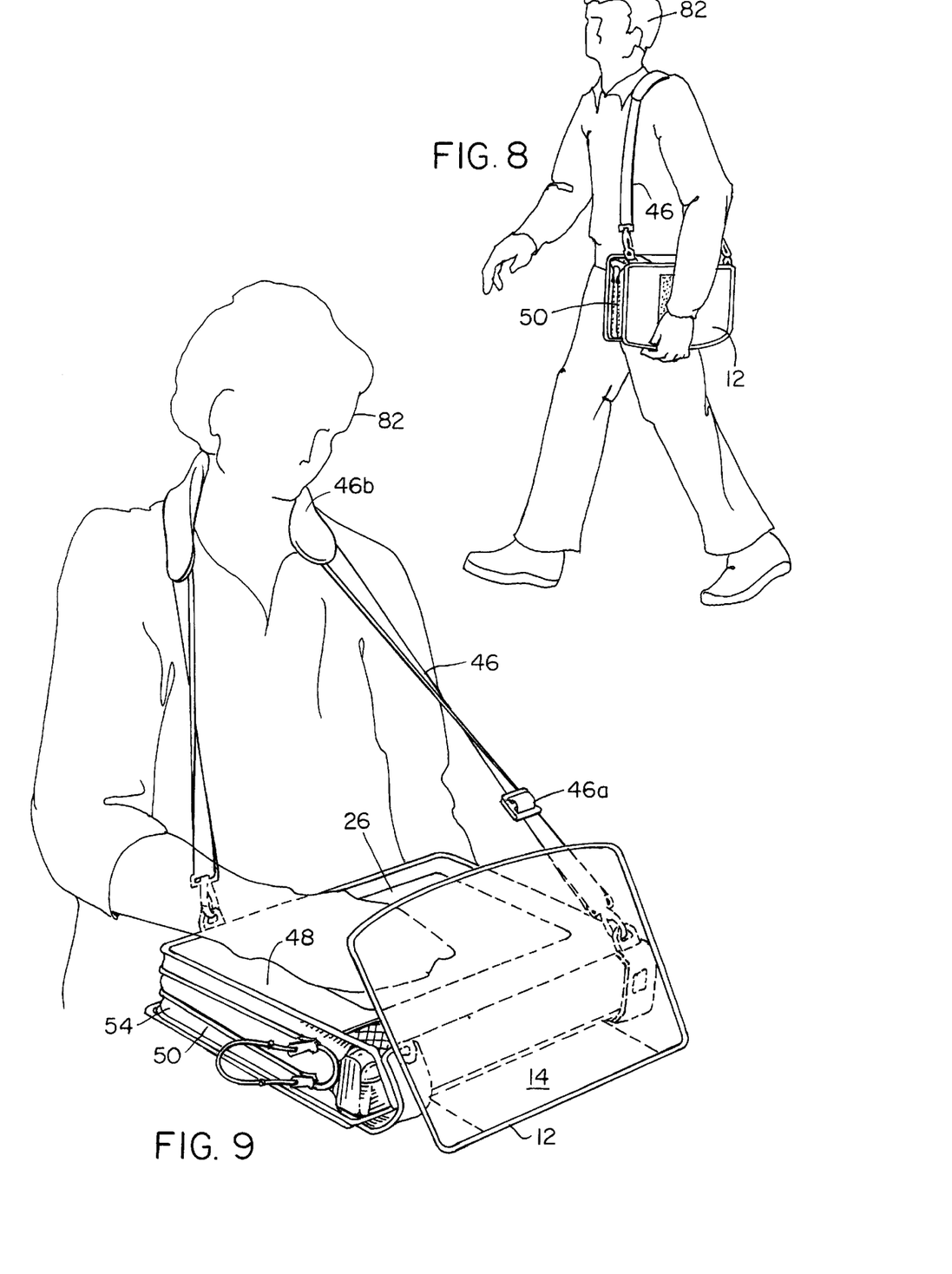
FIG. 8 is a side view of a person carrying the tablet computer in the carrying bag with the shoulder strap across the shoulder.
FIG. 9 is a perspective view depicting the user operating the tablet computer with the carrying bag being in a horizontal orientation.
Figure 10:
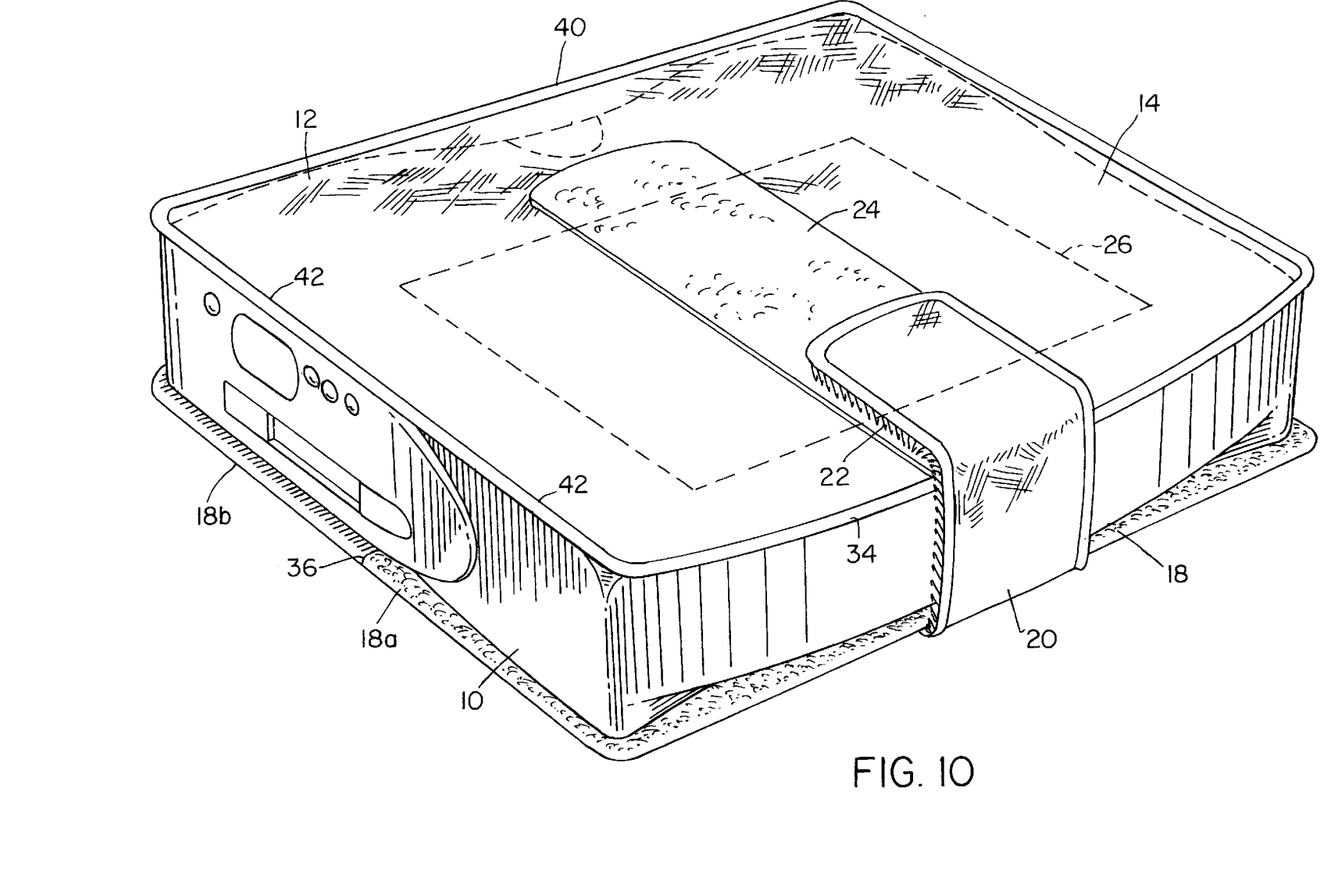
FIG. 10 is a front perspective view of the tablet computer protected by the jacket.
Figure 11:
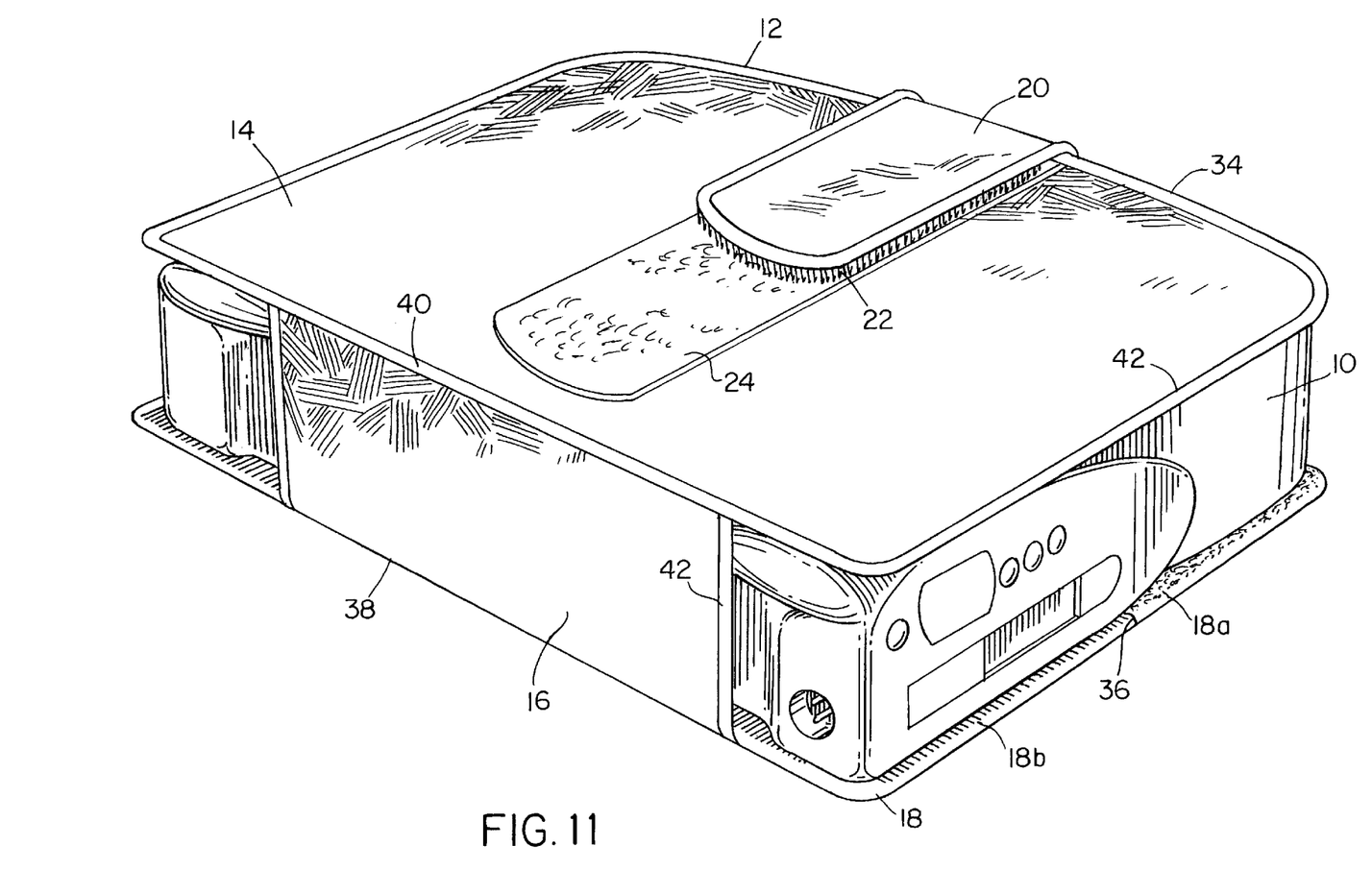
FIG. 11 is a rear perspective view of the tablet computer protected by the jacket.

In operation, computer 10 is preferably secured to a semi-rigid padded protective jacket 12 (FIG. 6) which provides additional protection to computer 10. The upper flap 56 of bag 50 is opened allowing computer 10 and jacket 12 to be inserted within bag 50. Once computer 10 is inside bag 50, upper flap 56 is secured in the closed position by two straps 60 extending from upper flap 56. Rear panel 16 and top panel 14 of jacket 12 are then positioned over the exterior of upper flap 56 and front wall 48 of bag 50, respectively. Top panel 14 covers opening 52 in front wall 48 of bag 50 for protecting screen 26 of computer 10. A patch of loop material 32 (FIG. 12) located on the interior surface of top panel 14 mates with a patch of hook material 74 located on front wall 48 below opening 52 to secure top panel 14 over opening 52 (FIG. 7). When inside bag 50, computer 10 can be carried on the shoulder in a vertical orientation with strap 46 attached to upper flap 56 (see FIGS. 7 and 8). In addition, bag 50 can be carried in a horizontal orientation by attaching strap 46 to lower wall 62 and upper flap 56 in a diagonal arrangement as depicted in FIG. 9. When computer 10 is in the horizontal orientation, the user can lift top panel 14 of jacket 12 and comfortably operate computer 10 by touching screen 26. Top panel 14 can be secured in an upright position to act as a shade for improving the viewing of screen 26 of computer 10.

A more detailed description of bag 50 and jacket 12 now follows. Referring to FIGS. 2–9, lower wall 62 and side walls 54 are formed by fabric such that those portions of bag 50 soft and flexible. Side walls 54 are preferably formed from heavy woven nylon fabric. Lower wall 62 preferably has heavy woven nylon fabric on the exterior surface and smooth nylon fabric on the interior surface with foam padding 5 to 6 mm thick sandwiched in between. Front wall 48, back wall 49 and upper flap 56 have flat semi-rigid cores which are covered with flexible material. The semi-rigid cores are preferably formed from sheets of plastic but alternatively can be made of other suitable materials such as cardboard or wood. The portion of front wall 48 surrounding opening 52 is covered with leather or a leather like material while the upper portion of the exterior of front wall 48 and the exterior of upper flap 56 are covered with a heavy woven nylon fabric with a mesh material covering the nylon fabric. The interior surfaces of front wall 48 and upper flap 56 are covered with smooth nylon fabric. The semi-rigid core of back wall 49 is padded on both sides with foam padding 5 to 6 mm thick. Back wall 49 is covered on the exterior surface with heavy woven nylon fabric and on the interior surface with smooth nylon fabric. Bag 50 is about 264 mm high, 327 mm wide and 63.5 mm thick. Alternatively, these dimensions can vary depending upon the dimensions of computer 10.

A circular hole in the semi-rigid core of front wall 48 forms a circular shaped soft region 72 (FIG. 3) allowing the on/off button of computer 10 to be operated. Two openings 70 are formed in the semi-rigid core on opposite sides of front wall 48. As a result, sound from the speakers of computer 10 is allowed to pass through front wall 48 to be heard by the user via holes 70a within the mesh material. A third opening 71 is made in the semi-rigid cores of upper flap 56 and front wall 48 between regions 70 for providing access to an infrared sensor on computer 10 through holes 70a in the mesh material.

Figure 1:
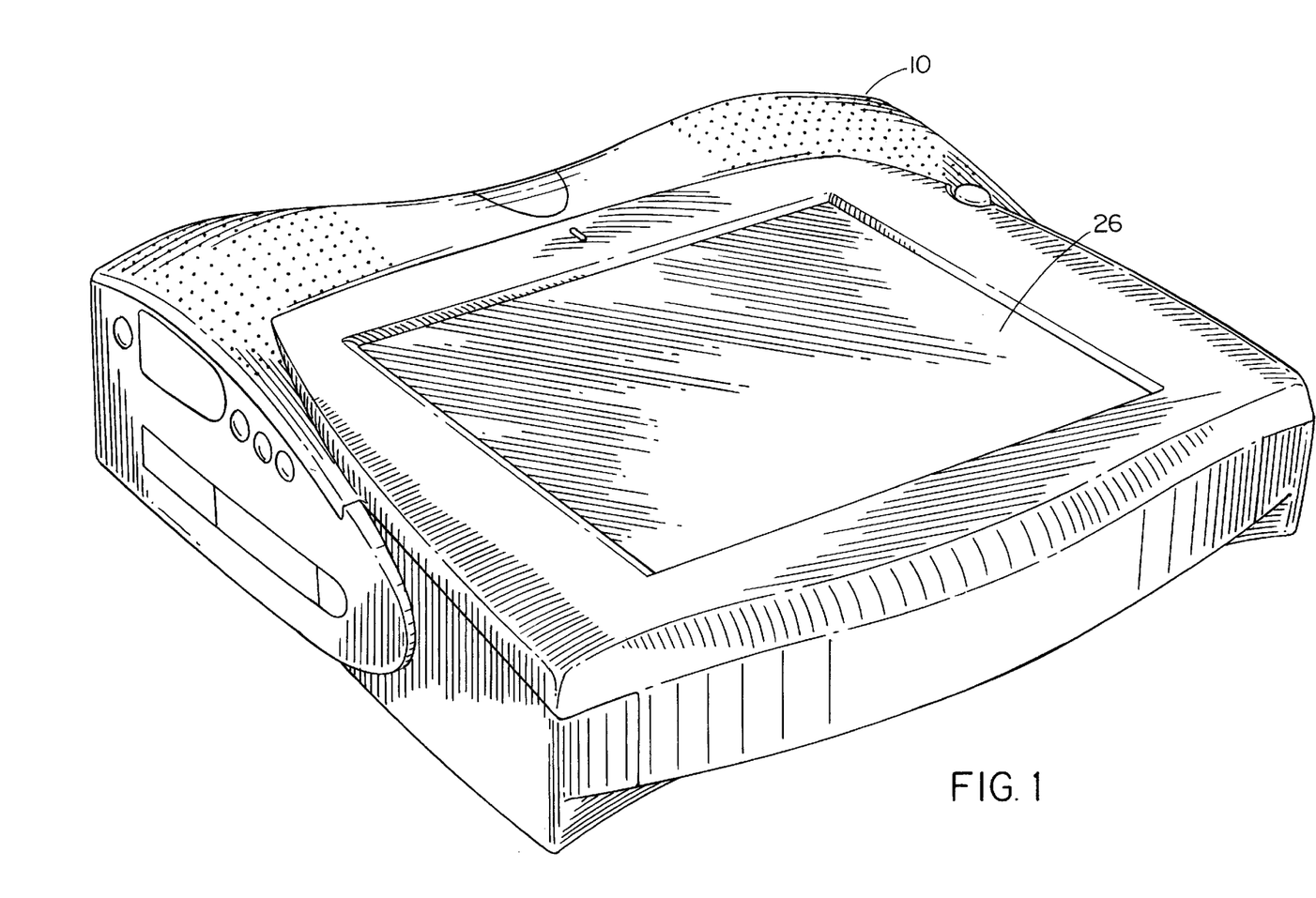
FIG. 1 is a perspective view of a particular tablet computer.
Figure 2:
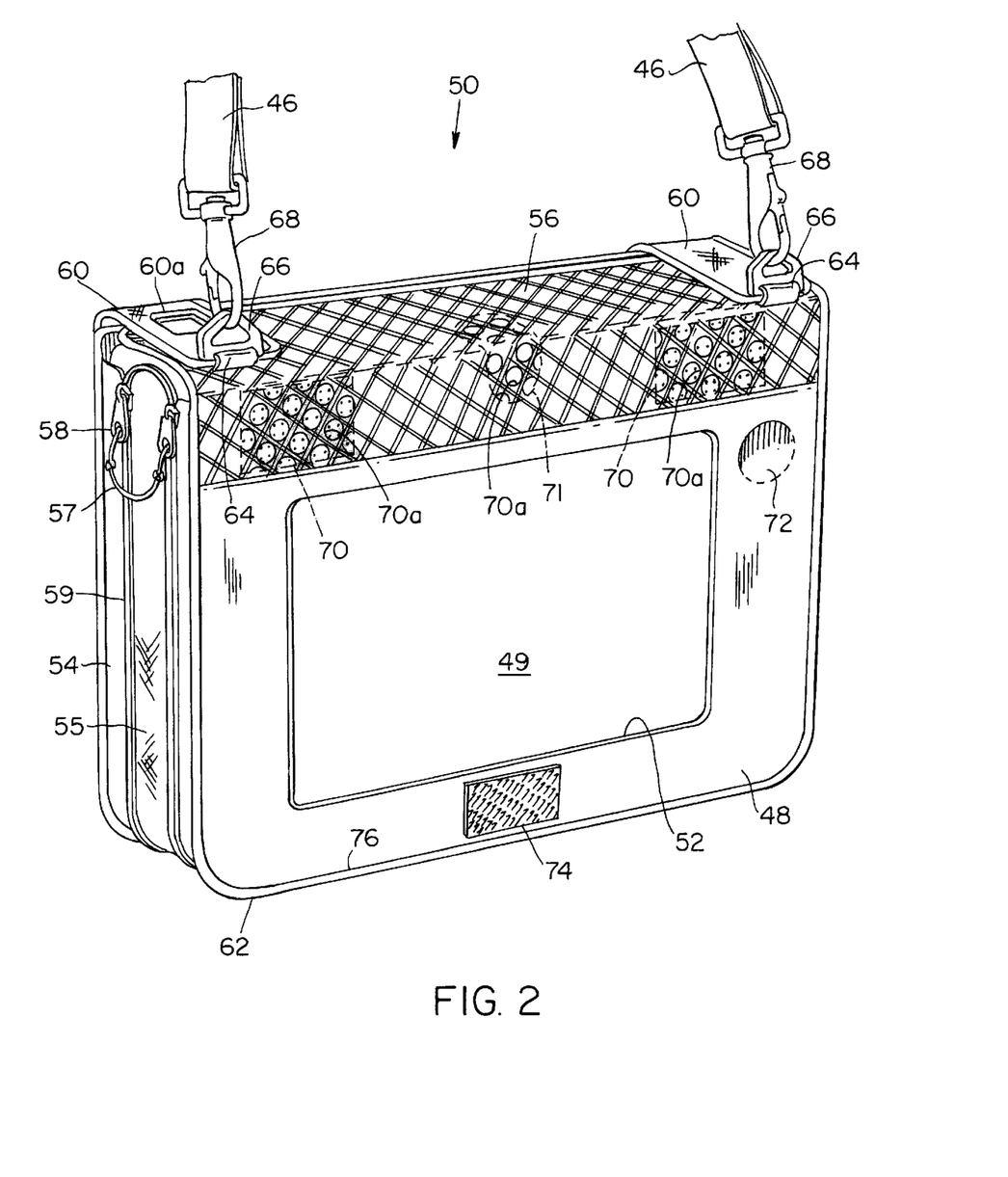
FIG. 2 is a front perspective view of the present invention computer carrying bag.
Figure 3:
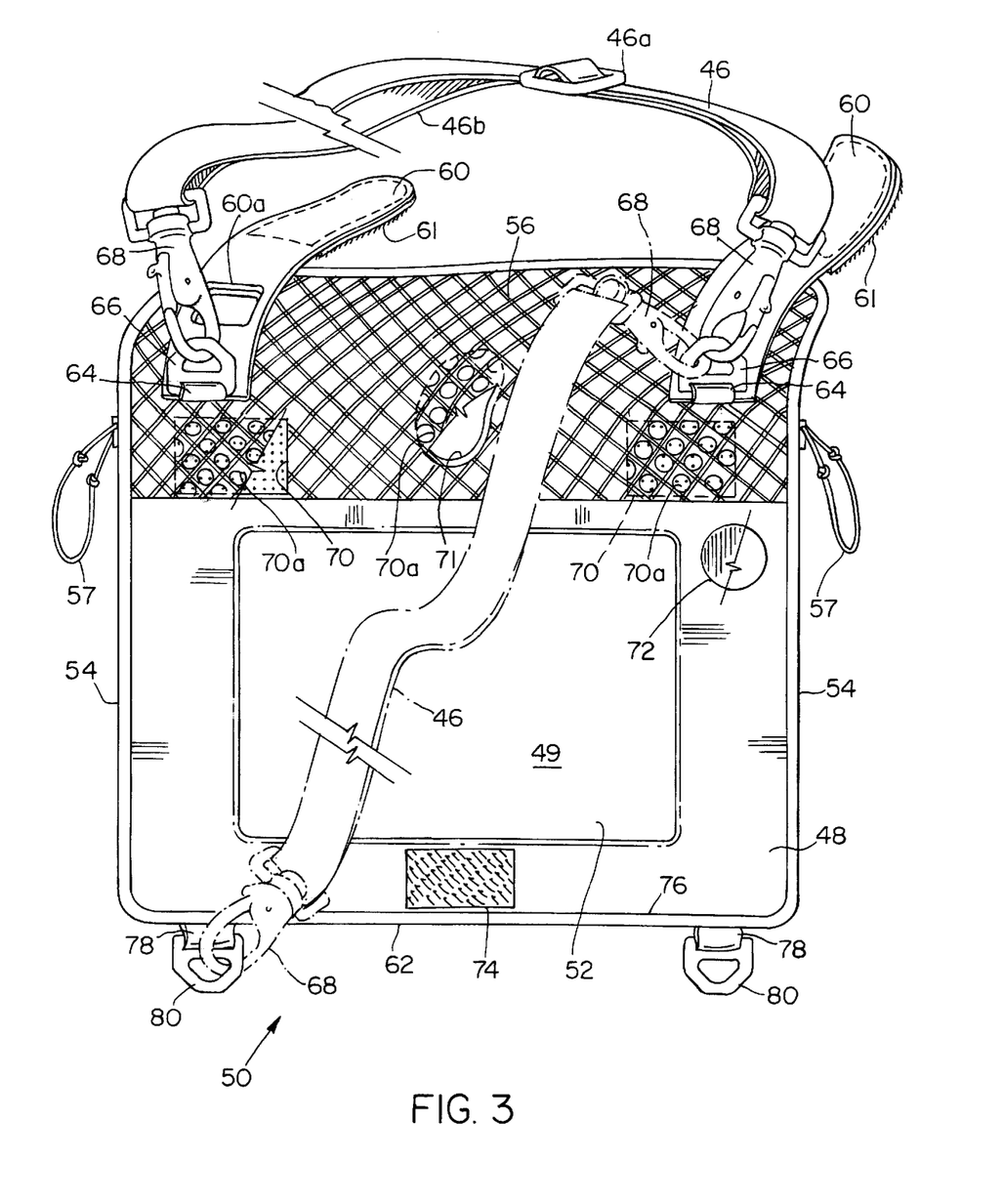
FIG. 3 is a front view of the carrying bag with the upper flap opened.
Figure 4:
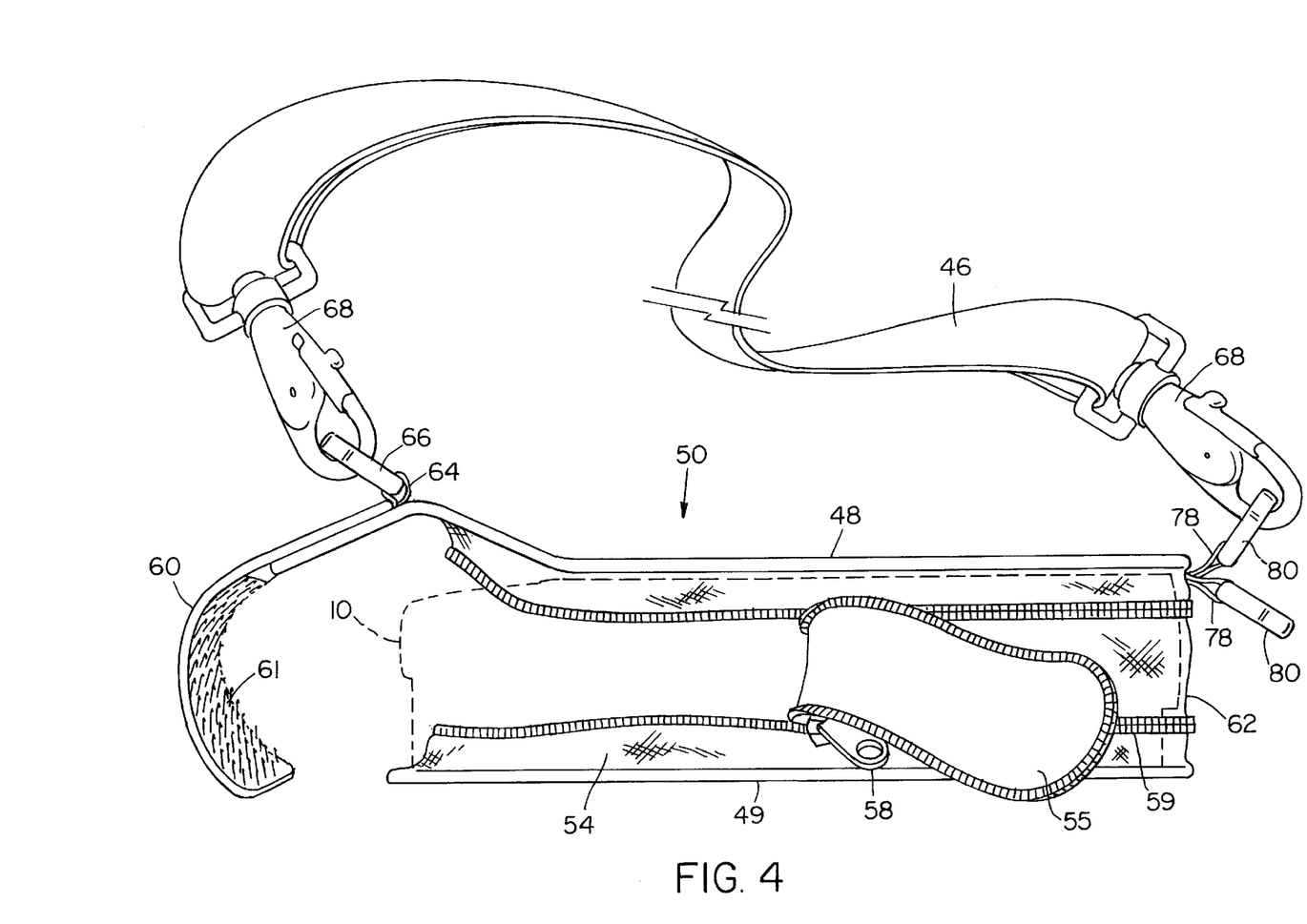
FIG. 4 is a side view of the carrying bag with a side flap opened depicting the tablet computer contained within.

Side walls 54 each include a zipper 59 having two parallel legs spaced apart from each other and joined together in an arc near upper flap 56. Each zipper 59 has two sliding tabs 58 for engaging and disengaging the legs of the zipper 59 (FIG. 2). The sliding tabs 58 are coupled together by a cord 57 allowing tabs 58 to be pulled in unison for opening the side flap 55. Opening side flaps 55 provides access to the disk and/or CD drives of computer 10 as well as any other features located on the sides of computer 10. Zippers 59 extend along side walls 54 onto the edges of lower wall 62 (FIG. 5) for providing greater access to the battery compartment of computer 10.

The straps 60 extend from upper flap 56 at opposite sides and each have hook material 61 for engaging mating patches of loop material 61a located on back wall 49 (FIG. 5) so that upper flap 56 can be secured in the closed position. An aperture 60a passes through upper flap 56 and one of the straps 60 allowing a power cord 63 to be connected to computer 10 (FIG. 7).

Two loops 64 of fabric are sewn to upper flap 56 near the upper portion of front wall 48 for securing rings 66 thereon. In addition, two loops 78 of fabric are sewn to lower wall 62 near the lower portion of front wall 48 for securing rings 80 thereon. Shoulder strap 46 includes two quick release connectors 68 for coupling to rings 66 for carrying bag 50 in a vertical orientation with shoulder strap 46 across the shoulder (FIG. 8) or for coupling to one ring 66 and one ring 80 diagonally oriented from each other for carrying bag 50 in a horizontal orientation (for operation) with shoulder strap 46 around the back of the user's neck (FIG. 9). Shoulder strap 46 includes an adjustment buckle 46a for adjusting the length of strap 46 and a padded region 46b for comfort.

Figure 5:
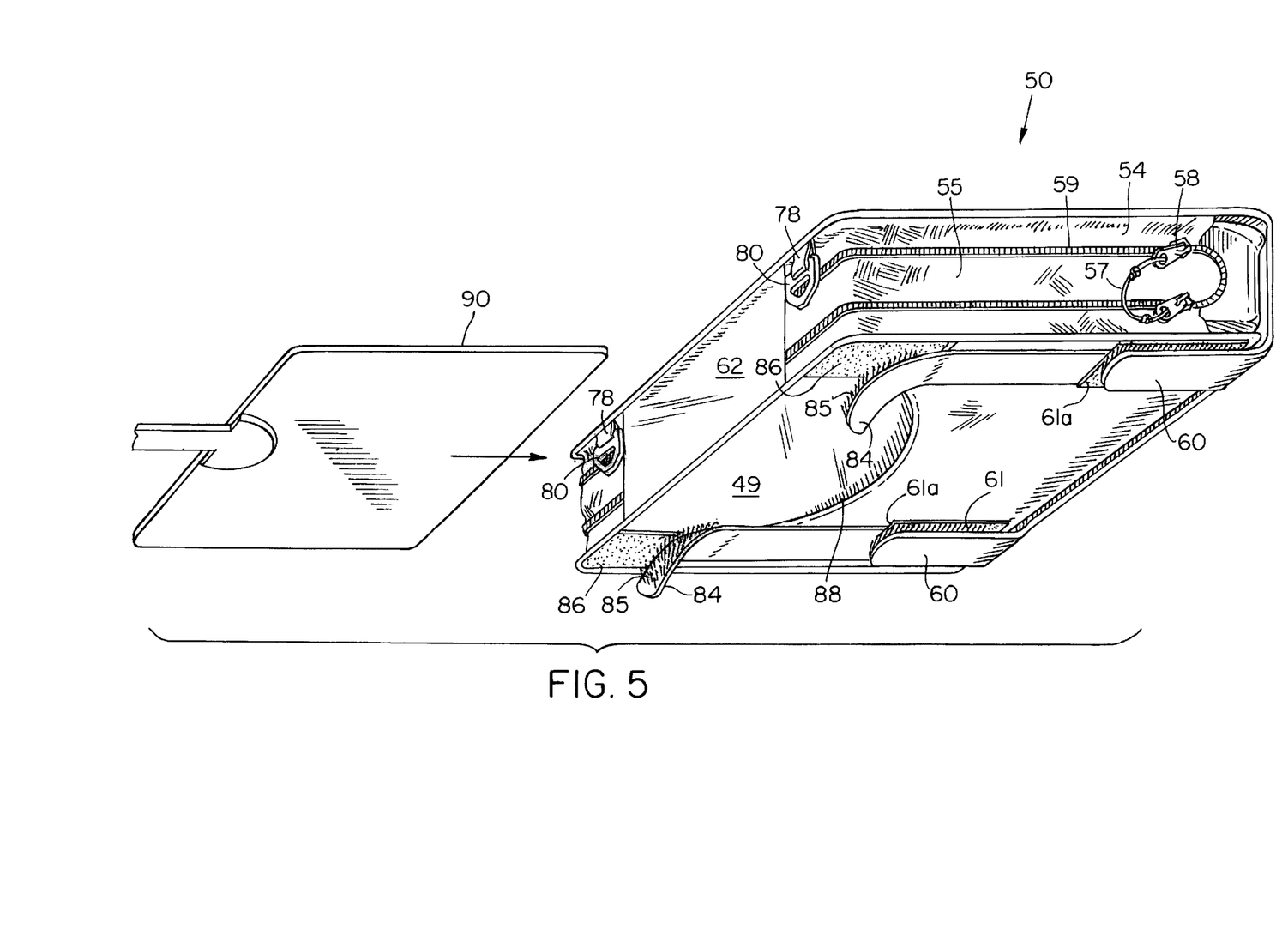
FIG. 5 is a bottom perspective view of the carrying bag positioned for mounting on a wheelchair bracket.

Referring to FIG. 5, back wall 49 includes a flat pocket 88 with an arcuate leading edge. Two straps 84 each having hook material 85 extend from the edge of pocket 88 at opposite sides. The hook material 85 on straps 84 engage respective patches of loop material 86 located on back wall 49 near the edge of pocket 88. Bag 50 can be secured to a support bracket 90 of a wheelchair by disengaging straps 84 and inserting a flat plate of bracket 90 within pocket 88. Re-engaging straps 84 with loop material 86 secures the flat plate of bracket 90 within pocket 88. The flat plate of bracket 90 is preferably in a horizontal position for horizontally orienting computer 10 so that the user sitting in the wheelchair can easily operate computer 10. Alternatively, bracket 90 can be positioned for supporting computer 10 in a vertical or tilted orientation.

Referring to FIGS. 10–13, jacket 12 can be employed to protect computer 10 without bag 50. When used in such a manner, jacket 12 wraps around computer 10 for protecting computer 10. Jacket 12 includes top panel 14, rear panel 16 and bottom panel 18 which are semi-rigid and foldably connected together. Bottom panel 18 is secured to the bottom of computer 10 with mating hook and loop fastener. A strap 20 extends from bottom panel 18 and includes hook material 22 for securing to a strip of loop material 24 located on the exterior surface of top panel 14. This fastens jacket 12 around computer 10 for protecting the screen 26 of computer 10 with top panel 14, the bottom of computer 10 with bottom panel 18 and the rear edge of computer 10 with rear panel 16. Three edges of computer 10 are open allowing access to the disk drives, ports and battery compartment of computer 10.

Figure 12:
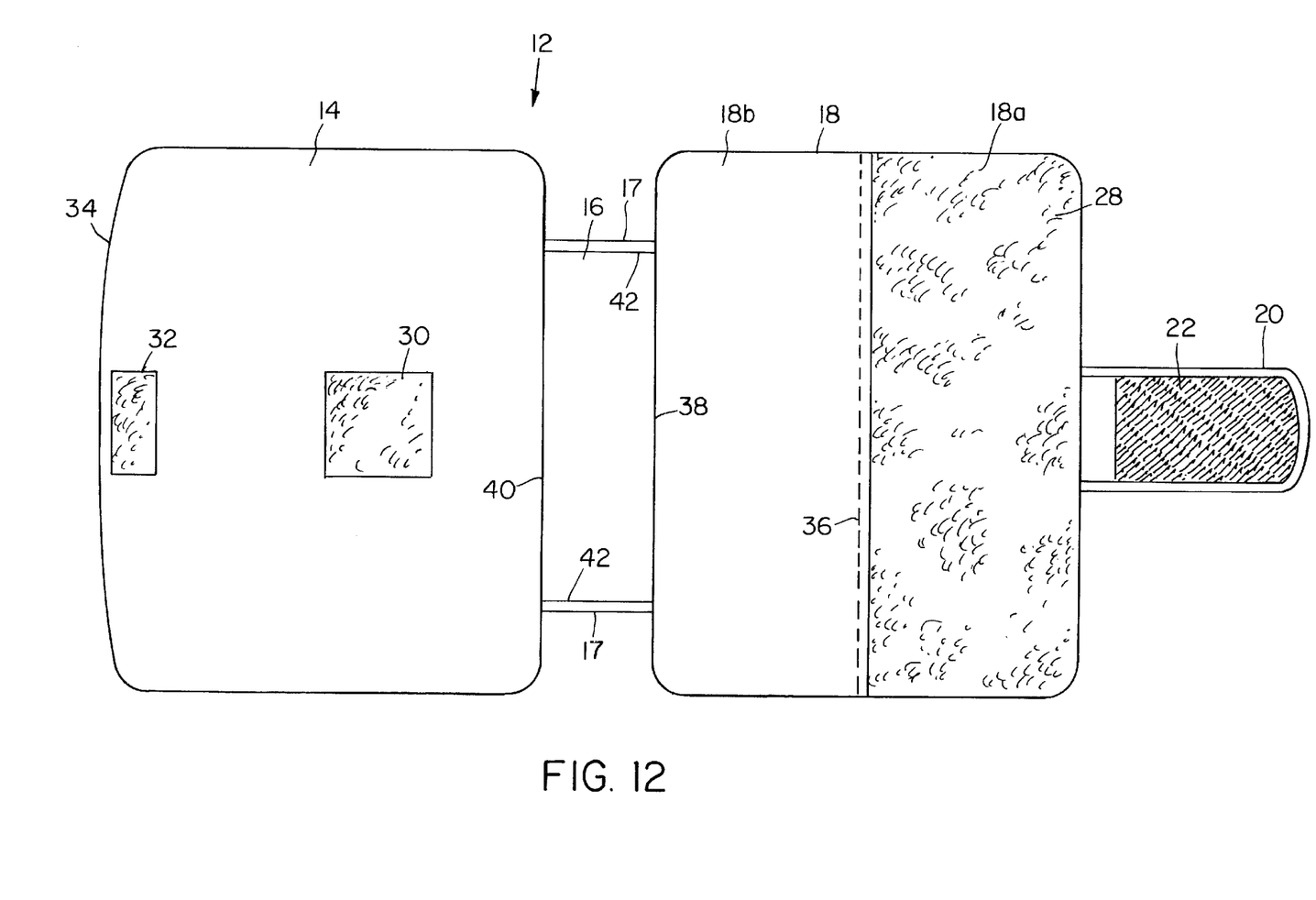
FIG. 12 is a plan view of the jacket showing the interior surfaces of the jacket.
Figure 13:
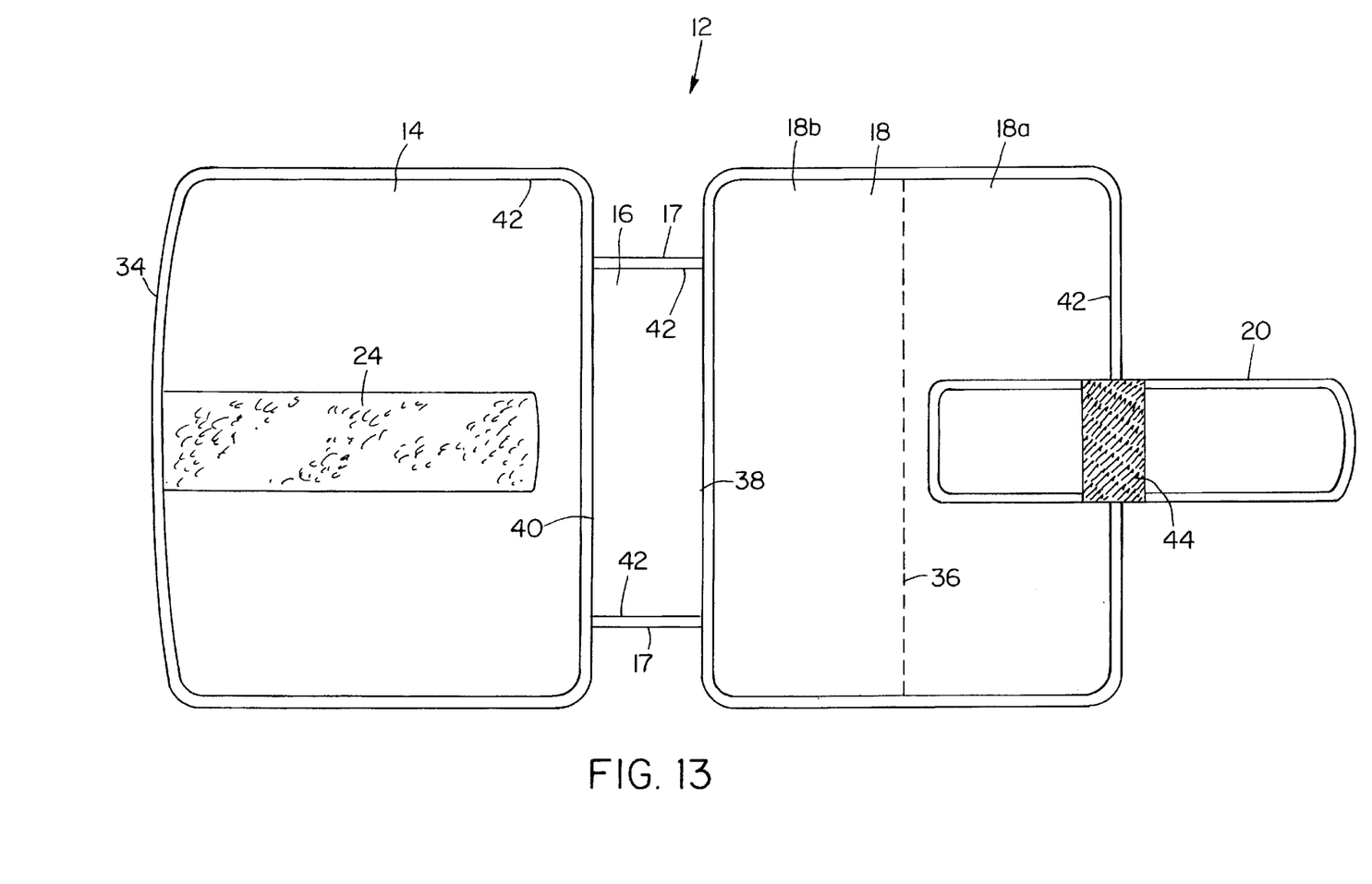
FIG. 13 is a plan view of the jacket showing the exterior surfaces of the jacket.

Referring to FIGS. 12 and 13, top panel 14 is foldably connected to rear panel 16 along fold line 40. Bottom panel 18 is foldably connected to rear panel 16 along fold line 38. Bottom panel 18 consists of two sub-panels 18a and 18b which are foldably connected together along a fold line 36. Fold lines 36, 38 and 40 are preferably parallel to each other. When jacket 12 is wrapped around computer 10, jacket 12 is folded along fold lines 38 and 40 so that top panel 14, rear panel 16 and bottom panel 18 are on different planes. Fold line 36 remains unfolded such that sub-panels 18a and 18b lie along a common plane. The edges 17 of rear panel 16 are recessed from the outer edges of top panel 14 and bottom panel 18 to provide access to ports and other features located at the rear of computer 10. The recessed edges 17 also provide room for straps 60 of bag 50 to be secured and released while rear panel 16 is covering upper flap 56. In addition, the recessed edges 17 allow loops 64 and rings 66 to extend upwardly from the upper flap 56 without being covered by rear panel 16 so that shoulder strap 46 can be coupled to rings 66.

The panels of jacket 12 have flat semi-rigid plastic cores 3 mm thick which are covered with foam that is 3 to 4 mm thick. The foam covered cores are enclosed by a flexible material such as fabric or leather, plastic film, etc. In one preferred embodiment, the exterior surfaces of top panel 14, rear panel 16 and bottom panel 18 are covered by heavy textured nylon material while the interior surfaces of sub-panel 18a, sub-panel 18b, and rear panel 16 are covered by smooth nylon. The flexible covering material allows panels 14, 16 and 18 to be foldably connected to each other. The interior surface of top panel 14 is covered with synthetic leather for providing a non-slip surface when jacket 12 is used as a stand (described later). Stitching 42 holds the covering materials together. Strap 20 is formed from heavy textured nylon material for flexibility.

The interior surface of sub-panel 18a preferably has loop material 28 covering the smooth nylon material. The loop material 28 fastens to mating hook material attached to the bottom of computer 10 in order to secure computer 10 to jacket 12. The interior surface of top panel 14 contains a centrally positioned patch of loop material 30 for attaching a sunshield for screen 26 of computer 10. As previously mentioned, the patch of loop material 32 located near the outer edge 34 of top panel 14 secures top panel 14 to the front wall 48 of carrying bag 50. Edge 34 of top panel 14 is curved allowing jacket 12 and computer 10 to be easily carried and handled. A patch of hook material 44 is located on the outer surface of bottom panel 18 and strap 20 approximately where strap 20 extends from the outer edge of sub-panel 18a. The patch of hook material 44 aids in assembling jacket 12 as a stand. Panels 14 and 18 in one preferred embodiment are approximately 320 mm by 260 mm wide. The outer edge 34 of top panel 14 has about a 2000 mm radius. Sub-panel 18a is about 120 mm wide. Alternatively, these dimensions can vary depending upon the dimensions of computer 10.

Figure 14:
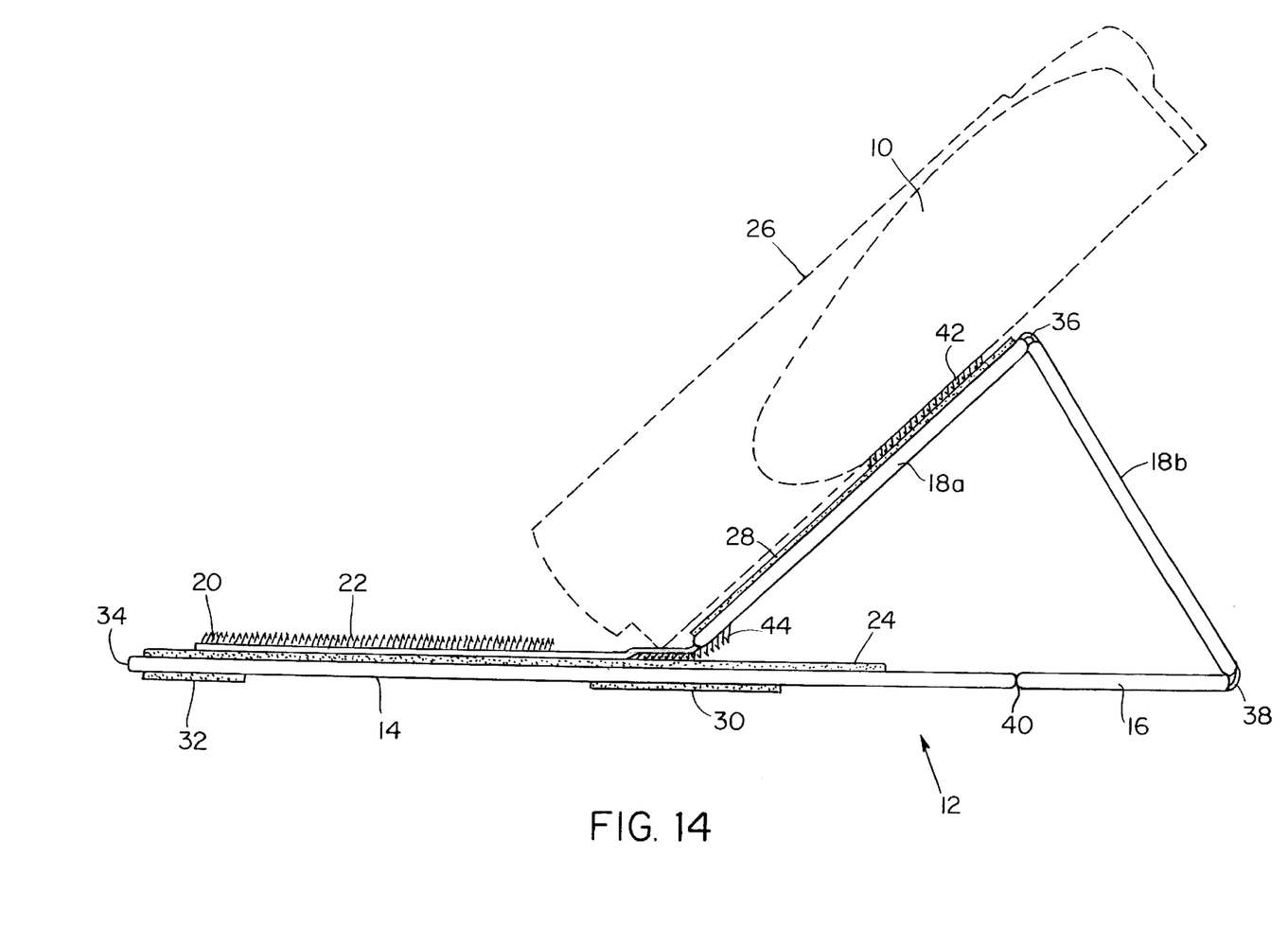
FIG. 14 is a side view of the jacket folded in order to position the tablet computer in a tilted position for operation.
Figure 15:
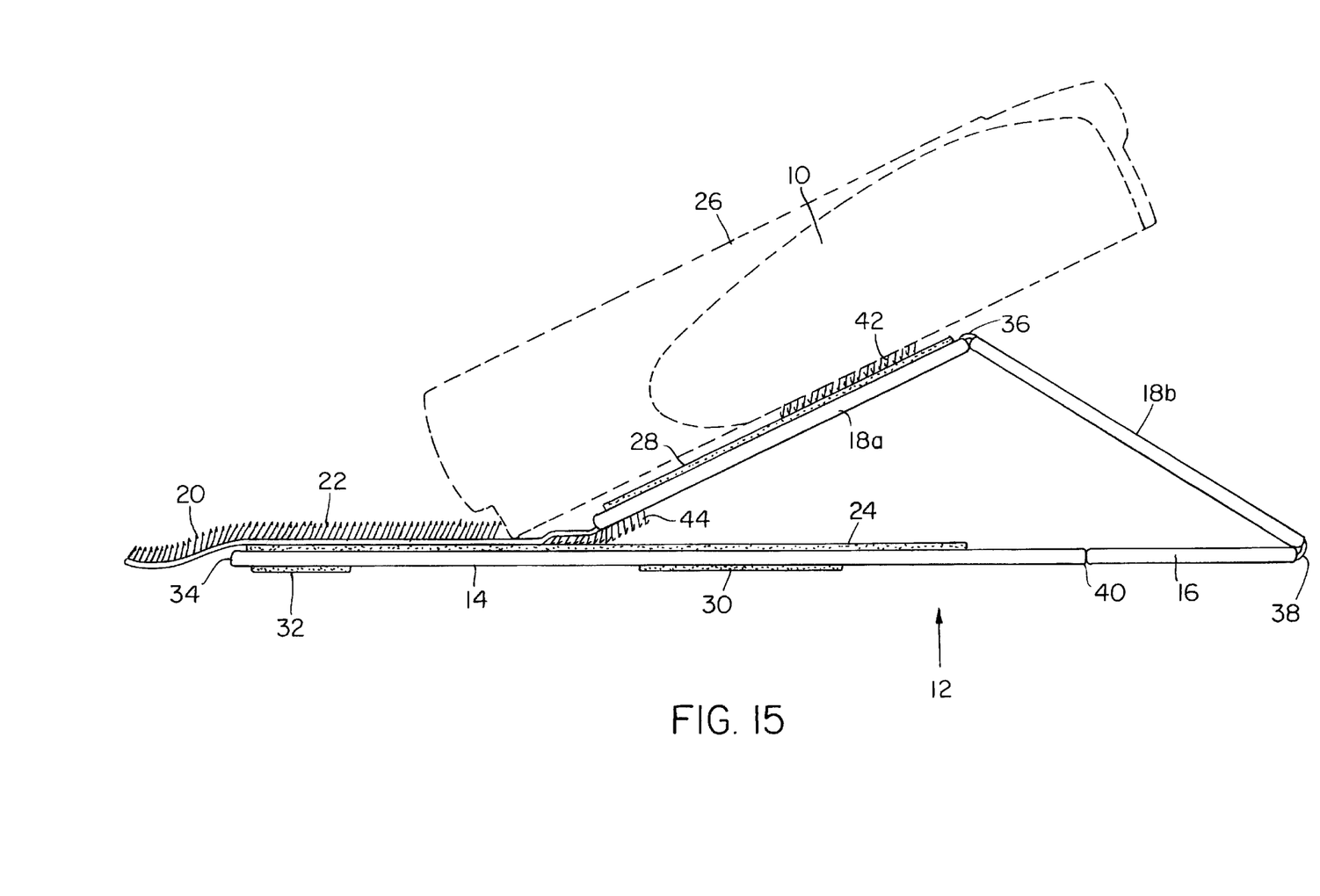
FIG. 15 is a side view of the jacket folded in order to position the tablet computer in a different tilted position.

Jacket 12 can be employed as a stand for computer 10 so that computer 10 can be more easily operated. When jacket 12 is folded in the manner depicted in FIG. 14 along fold lines 36 and 38, top panel 14 and rear panel 16 lie flat with their respective interior surfaces facing downward. The non-slip material on the interior surface of top panel 14 prevents the stand from sliding around. The patch 44 of hook material on the exterior surface of sub-panel 18a engages the loop material 24 located on the exterior surface of top panel 14 such that sub-panels 18a and 18b are positioned at an angle relative to each other and to panels 14 and 16. Fold line 40 is in an unfolded position. Since computer 10 is secured to the interior surface of sub-panel 18a, this positions computer 10 in a tilted position for use. Referring to FIG. 15, it can be seen that the angle of sub-panel 18a can be changed by changing the position of patch 44 relative to loop material 24.

EQUIVALENTS

While this invention has been particularly shown and described with references to preferred embodiments thereof, it will be understood by those skilled in the art that various changes in form and details may be made therein without departing from the spirit and scope of the invention as defined by the appended claims. Those skilled in the art will recognize or be able to ascertain using no more than routine experimentation, many equivalents to the specific embodiments of the invention described specifically herein. Such equivalents are intended to be encompassed in the scope of the claims.

For example, although bag 50 and jacket 12 are constructed to hold a tablet computer which has a screen located on the top surface of the computer, alternatively, bag 50 and jacket 12 can be constructed to hold laptop computers having screens that flip up. In addition, although bag 50 and jacket 12 are most useful for disabled persons and for certain occupations, bag 50 and jacket 12 are also suitable for use by the general public. Furthermore, although bag 50 and jacket 12 have specified the use of particular flexible materials such as nylon fabric etc., any suitable flexible material or combination of materials can be employed. Also, although various portions of bag 50 have been described to be semi-rigid or soft, alternatively, bag 50 can be made entirely rigid or entirely soft by employing the appropriate materials. Finally, the various straps and flaps of bag 50 as well as the strap of jacket 12 can be secured by other suitable means such as buttons, snaps, buckles, etc.

What is claimed is:

1. A carrying bag for a computer comprising:
    opposing front and back walls, an opening in the front wall providing access by a user for viewing a screen on the computer when the computer is contained within the bag;
    opposing first and second side walls extending between the front and back walls;

a lower wall extending between the front and back walls;

an upper flap positioned between the front and back walls; and a carrying strap, the carrying strap being selectively secured to the bag in a first arrangement for carrying the bag in a substantially vertical orientation and in a second arrangement for carrying the bag in a substantially horizontal orientation whereby the computer can be operated via the opening in the front wall while being carried in the substantially horizontal orientation.

2. The bag of claim 1 in which the carrying strap is securable to latching fixtures located on the lower wall and upper flap.

3. The bag of claim 2 in which the carrying strap is securable to the latching fixtures located on the upper flap to be in the first arrangement for carrying the bag in the substantially vertical orientation.

4. The bag of claim 2 in which the carrying strap is securable to one latching fixture on the upper flap and one latching fixture on the lower wall to be in the second arrangement for carrying the bag in the substantially horizontal orientation.

5. The bag of claim 1 in which the upper flap is openable and foldably connected to the front wall.

6. The bag of claim 5 in which the upper flap includes first and second straps for securing the upper flap to the back wall.

7. The bag of claim 1 further comprising opening devices on the first and second side walls for opening and closing said side walls.

8. The bag of claim 1 in which the upper flap includes an opening for providing access for a power cord.

9. The bag of claim 1 in which the back wall includes a mounting fixture for accepting a support member of a support bracket for supporting the bag.

10. The bag of claim 1 in which the front wall includes apertures for allowing sound from speakers of the computer to be heard by the user.

11. The bag of claim 1 in which the front and back walls are semi-rigid.

12. The bag of claim 11 in which the front wall includes a depressible region for allowing the user to access a button on the computer.

13. A bag for a computer comprising:

opposing front and back walls, an opening in the front wall providing access by a user for viewing a screen on the computer when the computer is contained within the bag;

opposing first and second side walls extending between the front and back walls;

a lower wall extending between the front and back walls;

an upper flap positioned between the front and back walls;

a mounting fixture comprising a pocket on the back wall for accepting a support member of a support bracket for supporting the bag; and a carrying strap, the carrying strap selectively being secured to the bag in a first arrangement for carrying the bag in a substantially vertical orientation and in a second arrangement for carrying the bag in a substantially horizontal orientation whereby the computer can be operated via the opening in the front wall while being carried in the substantially horizontal orientation.

14. The bag of claim 13 in which the front and back walls are semi-rigid.

15. The bag of claim 14 in which the front wall includes a depressible region for allowing the user to access a button on the computer.

16. A method of carrying a computer comprising the steps of:

providing a bag for housing the computer having opposing front and back walls, an opening in the front wall providing access by a user for viewing a screen on the computer, opposing first and second side walls extending between the front and back walls, a lower wall extending between the front and back walls, an upper flap positioned between the front and back walls, and a carrying strap;

securing the carrying strap to the bag in a first arrangement for carrying the bag in a substantially vertical orientation; and securing the carrying strap to the bag in a second arrangement for carrying the bag in a substantially horizontal orientation, whereby the computer can be operated via the opening in the front wall while being carried in the substantially horizontal orientation.

17. The method of claim 16 in which the bag includes latching fixtures located on the lower wall and upper flap, wherein securing the carrying strap in the first arrangement comprises the step of securing the strap to said latching fixtures located on the upper flap.

18. The method of claim 17 in which securing the carrying strap in the second arrangement comprises the step of securing the strap to one latching fixture on the upper flap and one latching fixture on the lower wall.

19. The method of claim 16 further comprising the step of covering the computer with a semi-rigid jacket, said jacket having a top panel which extends on the outside of the bag and is capable of being secured in place over the opening in the front wall for protecting the screen of the computer.

* * * * *